US006752939B2

(12) United States Patent
Gereg

(10) Patent No.: US 6,752,939 B2
(45) Date of Patent: Jun. 22, 2004

(54) METHOD FOR PREDICTING THE SUITABILITY OF A SUBSTANCE FOR DRY GRANULATION BY ROLLER COMPACTION USING SMALL SAMPLE SIZES

(75) Inventor: George W. Gereg, Bethel, CT (US)

(73) Assignee: Boehringer Ingelheim Pharmaceuticals, Inc., Ridgefield, CT (US)

( * ) Notice: Subject to any disclaimer, the term of this patent is extended or adjusted under 35 U.S.C. 154(b) by 454 days.

(21) Appl. No.: 09/902,086

(22) Filed: Jul. 11, 2001

(65) Prior Publication Data

US 2002/0039603 A1 Apr. 4, 2002

Related U.S. Application Data

(60) Provisional application No. 60/220,433, filed on Jul. 24, 2000.

(51) Int. Cl.[7] ......................... B29B 11/14; B29B 13/10; B29B 9/02

(52) U.S. Cl. ...................... 264/40.1; 264/115; 264/118; 264/120; 264/122; 264/123

(58) Field of Search ............................... 264/40.1, 115, 264/118, 120, 122, 123

(56) References Cited

U.S. PATENT DOCUMENTS

| | | | | |
|---|---|---|---|---|
| 3,255,279 A | | 6/1966 | Smith | |
| 4,121,289 A | * | 10/1978 | Stiel | 702/84 |
| 4,880,373 A | | 11/1989 | Balog et al. | |
| 5,035,845 A | | 7/1991 | Gasiorek | |
| 5,160,680 A | * | 11/1992 | Serpelloni et al. | 264/126 |

FOREIGN PATENT DOCUMENTS

| | | |
|---|---|---|
| DE | 715247 | 12/1941 |
| DE | 19728767 C1 | 1/1999 |
| EP | 0213470 | 3/1987 |
| JP | 59050999 | 3/1984 |
| JP | 61184440 | 8/1986 |
| JP | 09157702 | 6/1997 |

* cited by examiner

*Primary Examiner*—Stephen J. Lechert, Jr.
(74) *Attorney, Agent, or Firm*—Robert P. Raymond; Anthony P. Bottino; Timothy X. Witkowski

(57) ABSTRACT

An apparatus for fabricating small compacts of formulations of a drug candidate, and a method for determining if a drug candidate, alone or in a formula mix, is suitable for dry granulation by a roller compactor based on physical measurements generated in part from such small compact.

5 Claims, 7 Drawing Sheets

METHOD FOR PREDICTING THE SUITABILITY OF A SUBSTANCE FOR DRY GRANULATION BY ROLLER COMPACTION USING SMALL SAMPLE SIZES

RELATED APPLICATION DATA

This application claims benefit to U.S. provisional application No. 60/220,433, filed Jul. 24, 2000.

BACKGROUND OF THE INVENTION

1. Field of the Invention

The subject invention relates to an apparatus for fabricating small compacts, and a method for determining if a drug candidate, alone or in a formula mix, is suitable for dry granulation by a roller compactor based on test results generated in part from such small compact. The method is particularly useful when large quantities necessary to run a conventional roller compactor are difficult and/or costly to acquire. The subject invention permits accurate prediction of full-scale production results from relatively small sample sizes of drug candidate.

2. Background of the Related Art

In order for medicinal substances to be compressed into a solid dosage form, such as a tablet, it is necessary that the material possess a number of physical characteristics. These characteristics include the ability to flow freely, cohesiveness, and lubrication.

Free flow of material is necessary to prevent clogging of a conventional compression press. Material to be made into a compact must freely flow from the source of the material to the die. The material must also possess some degree of cohesiveness to keep the compact from crumbling and falling apart on handling. Lastly, the material must have a degree of lubrication in order to minimize friction and to allow for the removal of the compact. With regard to compactions to be used as final dosage forms, they must also possess a suitable degree of hardness, disintegration ability and uniformity.

While certain materials (such as potassium salts, ammonium chloride and methenamine) may be directly compressed into final dosage forms without modifying the physical nature of the material itself, or are therapeutically effective in such low amounts that they may be compressed into a solid dosage form merely by mixing with a diluent possessing suitable compression characteristics, most materials require regimented processing prior to compression. For example, a fine powder may not flow properly into a tablet press or the resulting tablet may not possess the required hardness to maintain integrity during packaging and shipping. Methods of formulation and preparation have been developed to impart desirable characteristics to materials that can not be compressed directly into a final dosage form. Among the methods used to improve the physical characteristics of materials are: forming an admixture with one or more inert substances, communition of the material, and granulation of the material or material formulation.

Addition of one or more inert substances (e.g. excipients) can significantly improve the qualities of a material which is desired to be compressed. Excipients that provide a specific function are well known. In diluting the active with inert substances, it is important that the blend of ingredients for production be homogeneous and provide good powder flow characteristics.

Comminution in its broadest sense is the mechanical process of reducing the size of particles or aggregates and embraces a wide variety of operations including cutting, chopping, grinding, crushing, milling, micronizing and trituration. Materials are often comminuted to improve flow properties and compressibility. Flow properties and compressibility of materials are influenced significantly by particle size or surface area of the particle.

Conversion of powders to granules (a small cohesive mass made up of a plurality of powder particles) frequently offers a number of advantages including improving uniformity of the blend, improving uniformity of particle size, reducing dust hazards, allowing improved product flow, improving uniform bulk density, controlling particle hardness and improving dispersability. Two of the most commonly employed granulation methods are wet-granulation and dry-granulation.

In wet-granulation, a liquid binder solution is combined with a bed of mixed powders to mass the particles together into granules. The damp mass is then screened, dried and milled (as through a comminuting mill or tornado mill) to the desired size. The mass may also be dry screened, lubricated and compressed or extruded through a perforated screen and then dried. In drying, it is often desirable to maintain a residual amount of moisture in the granulation in order to maintain a hydrated state and to reduce static electric charges on the particles. Moisture content of the granulation should be uniform.

Wet granulation suffers from a number of disadvantages. A chief disadvantage is the number of separate steps involved, as well as the time and labor necessary to carry out the procedure. Further, the use of aqueous solvents is limited by the stability of the product to be granulated. Explosion concerns and environmental regulations may limit the use of certain organic solvents.

Dry granulation is used when materials have sufficient inherent binding or cohesive properties to form granules. Dry granulation refers to the process of granulating without the use of liquids. In order for a material to be dry granulated at least one of its constituents, either the active ingredient or a diluent, must have cohesive properties.

Dry granulation may be performed by a process known as "slugging." In "slugging" the material to be granulized is first made into a large compressed mass or "slug" typically by way of a tablet press using large flat-faced tooling (an example of a linear press is illustrated in U.S. Pat. No. 4,880,373 to Balog et al. which is incorporated by reference herein). A fairly dense slug may be formed by allowing sufficient time for the air to escape from the material to be compacted. Compressed slugs are then comminuted through a desired mesh screen manually or automatically as, for example, by way of a comminuting mill. Formation of granules by "slugging" is also known as precompression. When tablets are made from the granulated slugged material, the process is referred to as the "double compression method."

Dry granulation may also be performed using a "roller compactor." In a roller compactor material particles are consolidated and densified by passing the material between two high-pressure rollers. The densified material from a roller compactor is then reduced to a uniform granule size by milling. The uniform granules may then be mixed with other substances, such as a lubricant, to tablet the material (as, for example, by way of a rotary tableting machine). In addition to pharmaceutical use, roller compaction is used in other industries, such as the food industry, animal feed industry and fertilizer industry.

Dry granulation has several advantages over wet granulation including its usefulness with respect to ingredients that are sensitive to moisture or unable to withstand elevated temperatures during drying, and because it does not use organic solvents which may pose health and environmental hazards. There are also fewer steps involved in dry granulation than wet granulation. Dry granulation by means of roller compaction is an efficient and useful method of granulation capable of handling a large amount of material in a short period of time (dry granulation by "slugging," on the other hand, may be slow, inefficient, and many times requires several attempts at a successful formulation to ensure material flow).

An early understanding of the compaction properties of a candidate drug substance is important. The need for viable dosage forms of candidate drug substances for pharmacological testing purposes, often significantly precedes the ability of a company to synthesize large quantities of the candidate drug. Unfortunately in early-stage pharmaceutical development it is often the case that only small batch sizes of candidate drug substances are available for pharmaceutical and pharmacological characterization. With limited supply of a drug substance available, losses due to the employment of less than efficient formulation techniques may not be easily tolerated.

As stated above, the ability of a material to be dry granulated by a roller compactor offers many advantages. Unfortunately conventional roller compactors require a significant amount of bulk material for operation. Recently Fitzpatrick Company (South Plainfield, N.J.) has introduced a bench top roller compactor for research and development work, the Chilsonator® IR220 unit. The Chilsonator® IR220 unit is designed for small scale production. Like other conventional roller compactors, the Chilsonators® IR220 unit has a horizontal feed screw which carries material to a vertical feed screw, finally depositing material between a drive roll and a driven roll where the material is compacted into a pre-determined shape. Unfortunately the Chilsonator® IR220 unit still requires at least fifty (50) grams of material for processing, a considerable amount of material in early stage pharmaceutical development.

Given the many different avenues for formulating a drug product, and the many different physiochemical properties displayed by pharmaceutical actives, it is often difficult to determine an efficient methodology for preparing dosage forms containing a newly discovered pharmaceutical active. There is a significant need for methodologies that would allow one to use physical information obtainable from small quantities of pharmaceutical active to arrive at efficient large scale formulation protocols for the drug candidate (without the need for numerous trials and errors with large quantities of pharmaceutical actives using production scale devices).

As direct compaction, and roller compaction using dry granulations, provide numerous advantages in pharmaceutical formulations (not the least of which is the removal of the possibility of reaction of the drug candidate with a solvent as used in wet granulation), it would be advantageous to know using small sample sizes whether the drug candidate could be directly compacted without physical processing (with or without excipients), or compacted after dry granulation by a roller compactor (with or without excipients).

SUMMARY OF THE INVENTION

The present invention allows one to extrapolate physiochemical measurements made on bench-scale small sample sizes to efficient production-scale processing. The present invention provides an apparatus and method requiring only small samples (<50 grams) to predict if a substance can be directly compacted or compacted after dry granulated by roller compaction, alone or in combination with excipients. The present method may employ small compacts (comprising less than 50 grams, more preferably less than 30 grams, and yet more preferably less than 10 grams) made by way of a sealed press punch assembly.

In the sealed press assembly of the present invention, upper and lower guide sections house punches that interact in a sealed manner with a die to create compacts. A fill weight adjuster may be used to set the position of one of the punches in its respective guide section. The other punch is dynamically movable in its respective guide section. The press punch assembly of the present invention permits extremely small compacts to be made, and significantly reduces losses of material owing to "puffing" of the compacted material (that is the aerosolization of the material due to expulsion of air during the compaction procedure) due to the sealed relationship of the punches and die.

The present invention provides a method that includes the steps of characterizing the properties of the drug candidate, identifying process parameters suitable to achieve the necessary particle size and density using the dry granulation process, and then translating the laboratory data to a production roller compactor. Information generated from granules derived from compacts made using the press punch assembly of the present invention may, using the teachings set forth herein, be correlated to a production-type roller compactor to produce dry granulated material that has very similar powder/granule characteristics.

In one embodiment of the present invention there is provided a method for determining if a material, or material formulation, is suitable for dry granulation by roller compaction, said method comprising: (a) preparing a plurality of material compacts on a linear press utilizing a plurality of compression forces starting from the minimal force necessary to produce a visibly non-friable compact; (b) milling the plurality of material compacts through a mesh of sufficient size to form granule fractions rather than fine powder fractions; (c) measuring two or more properties of the granule fractions of step (b) selected from the group of properties consisting of: (1) the Carr index, (2) the static angle of repose, and (3) particle size distribution; (d) determining those granule fractions having at least two of the following characteristics: (1) a Carr Index below about 15%; (2) a static angle of repose between about 20° and about 40°, (3) a particle size distribution sufficient for mass flow and homogeneity; (e) adjudging the material or material formulation suitable for dry granulation by roller compaction based on one or more of the granule fractions of step (d) being recompressible into a non-friable compaction with and/or without formula excipients.

In another embodiment of the present invention there is provided a method for setting the compaction pressure of a production scale roller compactor for a particular material/material formulation comprising: (a) preparing a plurality of compacts of the material on a press utilizing a plurality of compression forces starting from the minimal force necessary to produce a visually non-friable compact; (b) milling the plurality of material compacts through a mesh of sufficient size to form granule fractions rather than fine powder fractions; (c) determining the granule fraction having the best flow as characterized by the fraction's Carr Index and Angle of Repose; (d) setting the compaction pressure per unit area of a production scale roller compactor to a pressure approximately (±20%) the pressure per unit area used to form the compact from which the granule fraction having the best flow was milled.

In yet another embodiment, a second tablet punch is movable with respect to the threaded adjuster. The threaded adjuster defines an adjuster recess. The press punch also includes a tablet ejection plug adapted and configured to couple within the adjuster recess. Upon coupling of the ejection plug into the adjuster recess, the second tablet punch moves with respect to the threaded adjuster.

These and other unique features of the system disclosed herein will become more readily apparent from the following description, the accompanying drawings and the appended claims.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE PREFERRED EMBODIMENT

The advantages, and other features of the system and method disclosed herein, will become more readily apparent to those having ordinary skill in the art from the following detailed description of certain preferred embodiments taken in conjunction with the drawings which set forth representative embodiments of the present invention.

Figure 1:
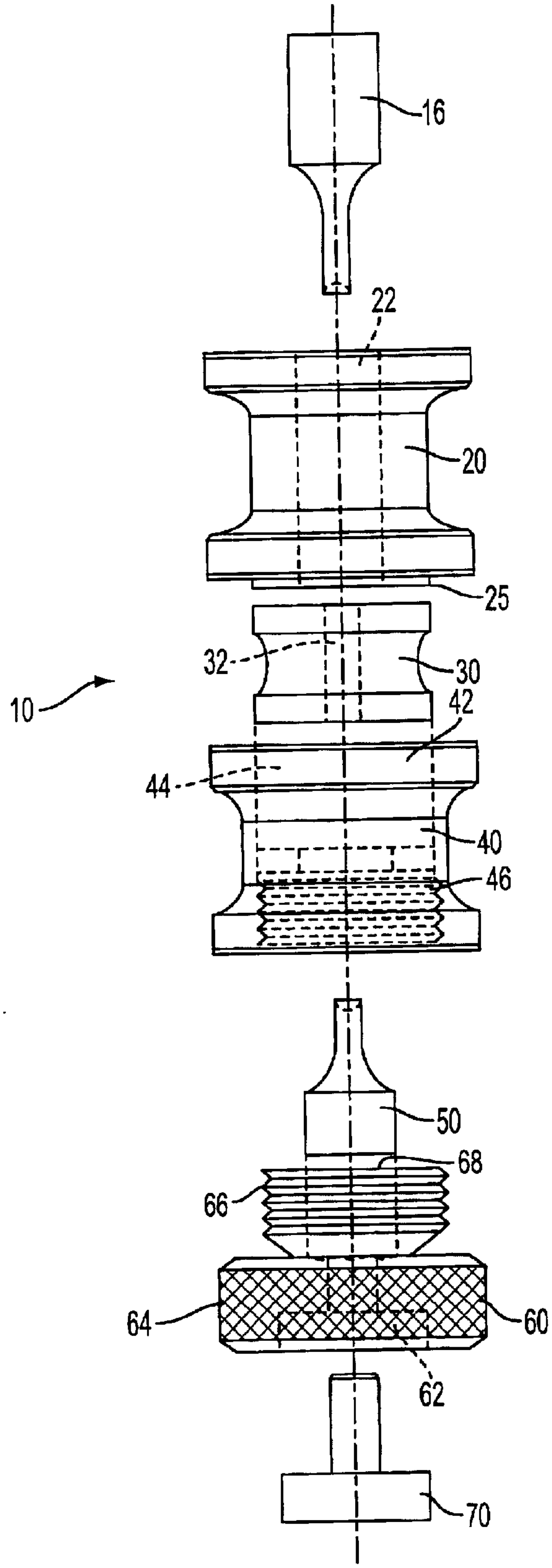
FIG. 1 is an exploded view illustrating the components of a preferred press punch assembly.

Referring to FIG. 1, there is shown an exploded view illustrating the components of a preferred press punch assembly 10 of the present invention. A lower guide section 40 defines a passage 42 having two different profiles. A first profile 44 is configured and adapted to receive die 30. A second profile 46 is configured and adapted to threadably engage fill weight adjuster 60. An upper guide section 20 defines a passage 22 for receiving upper punch 16. Upper guide section 20 carries boss 25 which permits snug engagement between upper guide section 20 and lower guide section 40. Tablet punch 16 may be, for example, a "B" type standard tablet punch with a lower cut with an overall length of 2.5 in. when die 30 has an outer diameter of 1.1875 in. Die 30 is preferably dimensioned to allow small fill sizes, e.g., an overall length of less than about 2.5 in.

In a preferred embodiment, fill-weight adjuster 60 comprises lower portion 64, threaded lower portion 66 (which threadably engages lower guide section 40) and lower punch 50. Threaded lower portion 66 includes recess 68, which houses at least a portion of lower punch 50. When lower punch 50 is movably mounted in recess 68, lower portion 64 preferably defines a recess 62, contiguous with recess 68. In such a case, plug 70 preferably is used to urge lower punch 50 vertically when inserted into recess 62. Fill-weight adjuster 60 determines the height of lower tablet punch 50 by varying the distance which adjuster 60 is threaded into lower guide section 40. As a result, the amount of material which can be received for compression varies according to the height of lower tablet punch 50.

Tablet die 30 includes bore 32 through which punches 16 and 50 engage. In operation, punch 50 is seated at least in part within lower guide section 40 and die 30, its vertical positioning in die 30 being set by the degree of threadable engagement between second profile 46 and threaded upper section 66. Material to be compressed is placed in die 30. Upper guide section 20 interfaces with lower guide section 40 by way of boss 25. Application of pressure to punch 16 so as to move punch 16 vertically through passage 22 of upper guide section 20 into bore 32 of die 30 allows formation of a compact. Punch 50 is preferably vertically-movable with respect to fill-weight adjuster 60. When punch 50 is vertically-movable with respect to fill-weight adjuster 60, plug 70 preferably may be used to eject manually any compact in die 30 after removal of upper guide section 20 and punch 16, by insertion of plug 70 into recess 62 of fill-weight adjuster 60. As would be understood by one of ordinary skill in the art, such process may be automated, as for example, by application of hydraulics.

In another embodiment, upper guide section and lower guide section are joined in a monolithic construction such that die 30 is permanently fixed therebetween.

Figure 2:
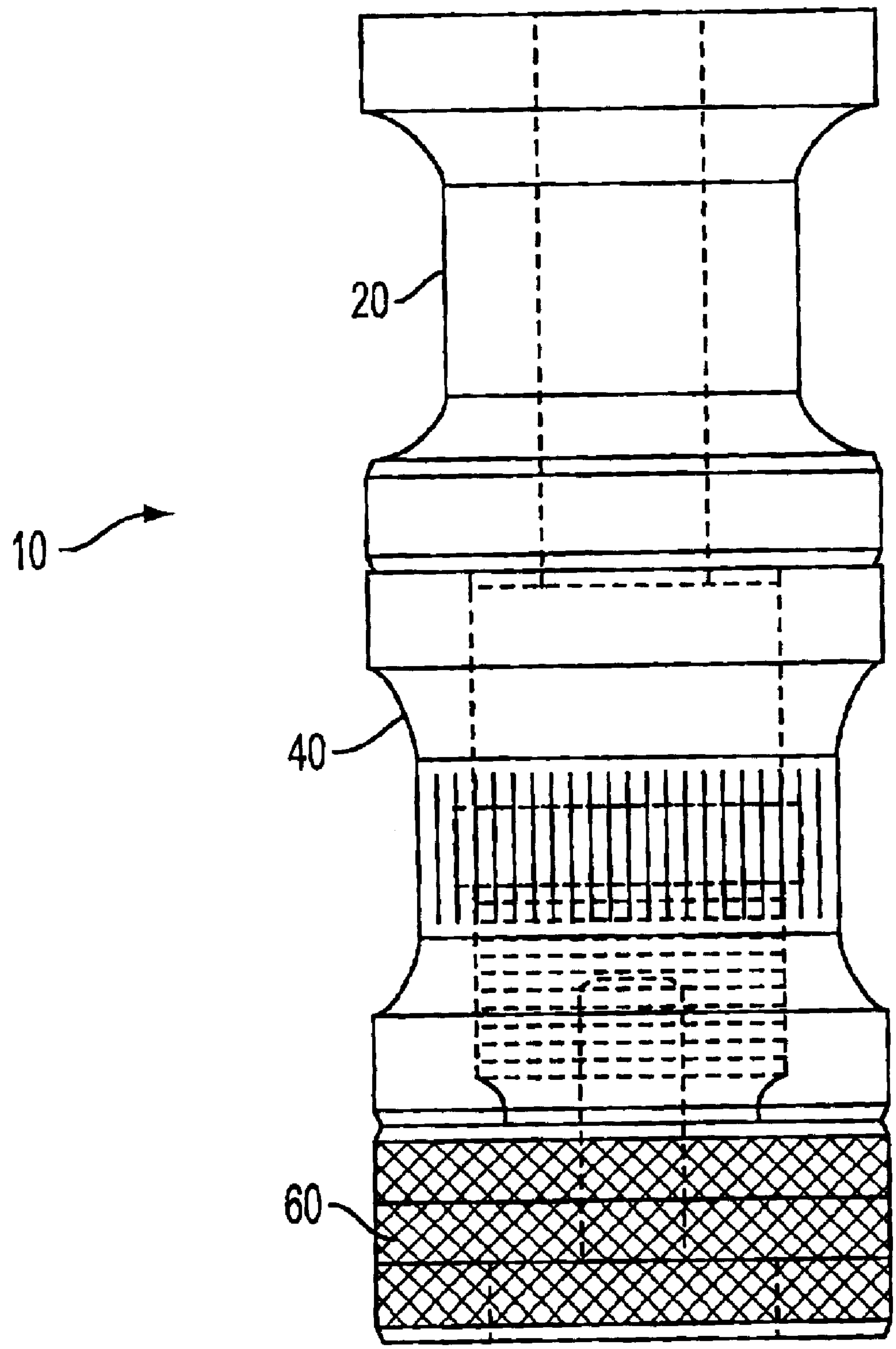
FIG. 2 is a perspective view of an assembled press punch assembly of FIG. 1.

Now referring to FIG. 2, there is shown upper guide section 20, lower guide section 40, fill-weight adjuster 60, and die 30 (not shown) assembled together to form an integrated punch holding fixture 10. As would be readily apparent to one of ordinary skill in the art, when press punch assembly 10 is integrated, the compression process is completely enclosed. As a result, external contaminants are isolated and during compression, minimal escape or "puffing" of the material being compressed will occur (due to trapped air being expelled). Additionally, the enclosed design protects the operator from injury in the case of breakage of the tip of one of the punches. Press punch assembly 10 has a short in-line stack design which emulates the weight control used on standard tablet presses. Preferably, press punch assembly 10 is configured to be compressed in a hydraulic twelve ton press, such as Carver Press model number 3850 commercially available from Carver Laboratory Equipment of Wabash, Ind.

Figure 3:
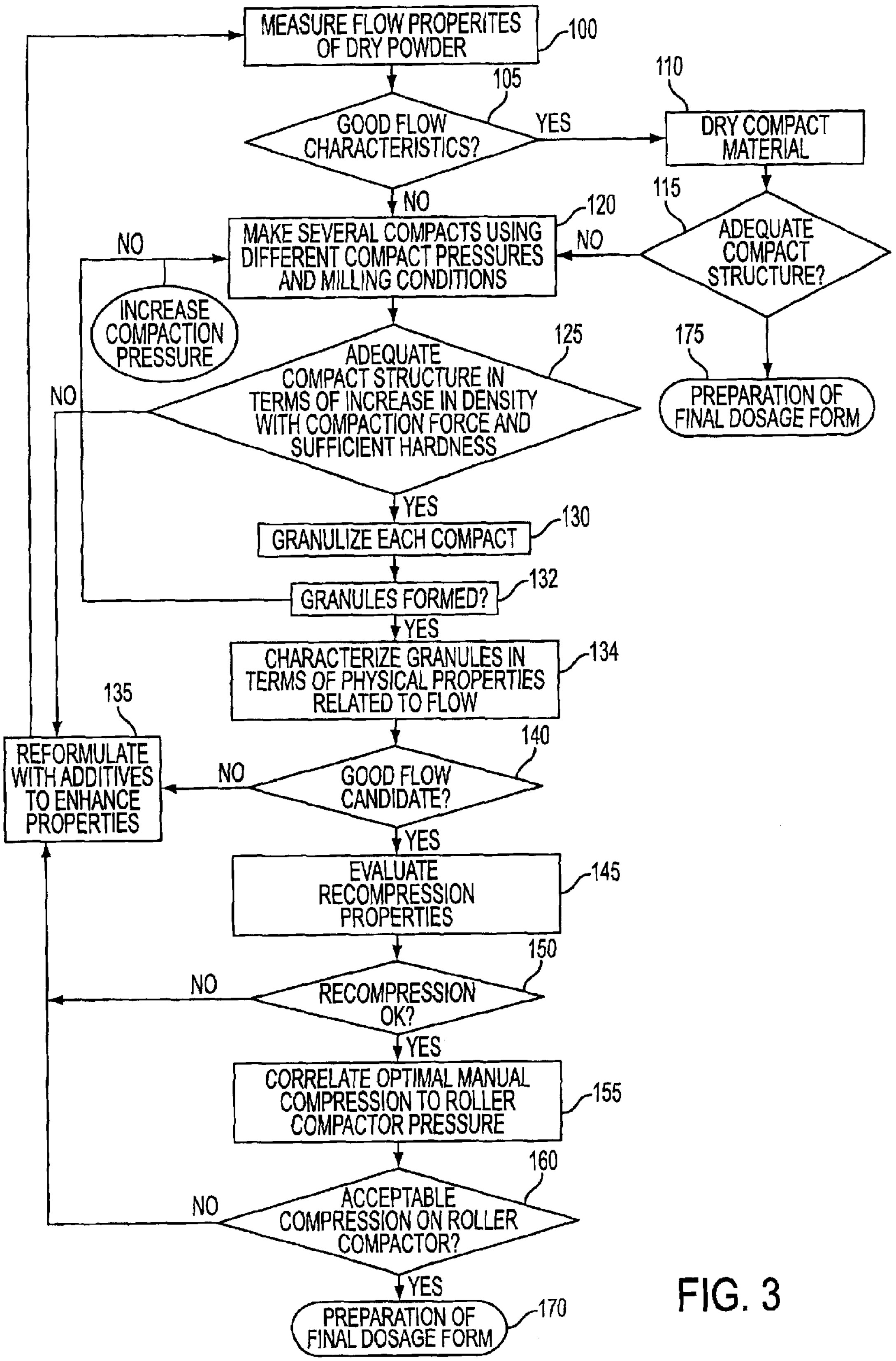
FIG. 3 is a flowchart illustrating a process for evaluating a material/material formulation for dry compaction.

Referring now to FIG. 3, there is illustrated a flow chart for a process for conducting a study of a substance to determine its suitability for automated dry compaction based on physical parameters measured with respect to the bulk material, and formulation compacts of the bulk material, preferably made utilizing press punch assembly 10. Optimized small scale processes may then be translated to large-scale processing, thus saving time and materials during early product development.

At step 100, test materials are characterized according to several physical criteria related to flow selected from the group consisting of: Carr Index, gravity flow rate, static angle of repose, sieve size distribution and morphology (visual and microscopic).

Bulk and tapped density are required to determine the Carr Index. Bulk density may be determined by filling a tared 100 mL graduated cylinder with powder to approximately the 70 mL mark and recording the exact volume ("$v_1$"). The cylinder is then weighed to determine the net powder weight ("w"). The bulk density, ρ, is calculated as follows:

$$\rho = \frac{w}{v_1}$$

The tapped density is the packing density after tapping a bed of powder until there is little or no change in the packing. Preferably, tap density may be determined by tapping a graduated cylinder containing the powder for 1000 taps using a tap density tester, model 50-1200 available from Van Kel North America of Edison, N.J. Tap density, $\rho_\tau$ is calculated using the equation:

$$\rho_T = \frac{w}{v_2}$$

where "$v_2$" is the volume occupied by the powder following tapping and "w" is the original weight of powder in the graduated cylinder.

The Carr Index may be determined from the bulk density and tap density. The Carr Index equals the ratio of the difference between tap density and bulk density, divided by tap density, expressed as a percentage:

$$\text{Carr Index} = \frac{\text{tapped density} - \text{bulk density}}{\text{tapped density}} \times 100$$

The Carr Index predicts how well a powder will flow. The Carr Index directly reflects the bulk granulation particle packing ability. Carr Index values below 15% indicate good flow characteristics, while values above 25% generally indicate poor flowability.

Preferably, test substances are also evaluated for their gravity flow rate. Gravity flow rate may be determined by running the material through a funnel. The amount of time for the funnel to empty the contents of material is the "elapsed time to empty." The gravity flow rate should be the average of at least three trials calculated as follows:

$$\text{Gravity Flow Rate} = \frac{\text{sample weight}}{\text{elapsed time to empty}}$$

Another criteria of flow, the static angle of repose, is the maximum angle that can be obtained between a freestanding surface of a powder heap and the horizontal plane. This criteria indicates the internal cohesive and frictional effects under low levels of external loading such as tablet die filling operations. The static angle of repose can be measured from the powder heaps generated by passing test substances through the plastic funnels. The static angle of repose is calculated as follows:

$$\tan\phi = \frac{2h}{D}$$

where ϕ is the static angle of repose, h is the height of the powder heap, and D is the diameter of the powder heap base. The determination of the static angle of repose should be based on the average of at least three trials. In general, values between about 20° to and 40° for the static angle of repose are indicative of good flow potential. However, a static angle of greater than about 50° indicates powder flow may be limited or non-existent.

An adequate sieve size distribution is important to overall good flow characteristics. Typically, sieve analysis is performed with a sifter for approximately 1 to 2 minutes, although a longer duration of time may be needed for materials that are more cohesive. While any of a number of shifters known to those of ordinary skill in the art may be employed, application may be of an ATM Sonic Sifter Model L3P available from ATM Corp. of Milwaukee, Wis. (e.g., with settings sift/pulse and an amplitude of seven). Test materials are introduced into a number of tared nested wire mesh screens having different apertures, such as 1000, 500, 250, 125, 63 and 50 μm respectively. The net weight of the powder retained on the screen is determined to calculate the percentage of material retained on each screen as follows:

$$\text{Percent retained} = \frac{\text{net weight on screen}}{\text{total net weight of sample}} \times 100$$

The percent retained on the screen indicates how much of the substance is composed of particles greater in size than the aperture of the screen. Materials having a particle size distribution wherein more than 25% of the total mass passes through a 50 μm sieve generally have less than desirable overall flow characteristics.

Particle size distribution can also be adjudged by light microscopy, as, for example, using a polarized light microscope (e.g., model BH-2 available from Olympus Optical Co. of Japan). A few drops of mineral oil are placed on a hemacytometer slide and a powder sample is dispersed in the oil. A cover slip is then placed over the oil/powder mixture. Typically, a total of about 200 to about 400 particles are counted for each sample and placed within particle ranges of 1–5, 5–10, 10–25, 25–50, 50–100, and >200 μm.

Particle morphology is also useful for predicting overall flow characteristics. Smooth particles tend to flow considerably better than irregular particles. The shape of particles may be examined by light and scanning electron microscopy and other methods known to those of ordinary skill in the art. Using a stereo light microscope, the maximum particle size, defined by the longest dimension, is determined (a stereo microscope such as model SZH available from Olympus Optical Co. of Japan may be used). A representative sample of the test substance is placed into a deep well slide containing a few drops of mineral oil. The sample slide is viewed using a calibrated reticule and the particles are rotated in the oil with a tungsten wire so that the axes can be measured.

Particle morphology may also be determined using scanning electron microscopy ("SEM") (for example, using a model S-4000 available from Hitachi Ltd. of Tokyo, Japan). Samples may be prepared for SEM imaging by sprinkling the powder particles on an aluminum stub with double-sided silver tape. The particles are then coated with platinum using a sputter coater and viewed under the SEM.

At step 105, the parameters measured at step 100 are evaluated to determine if the substance has adequate flow properties. If two or more, preferably three or more, of the following parameters are confirmed, the material is considered likely to be adequate for direct compaction without need for granulation: the Carr Index is below 15%, the static angle of response between 20° and 40°, the particle-size distribution is such that less than 25% of the total particles pass through a 50 micron sieve. Upon acceptable confirmation of such parameters, one proceeds to step 110 to make dry compact(s), and then determines if the compact has suitable compact characteristics (step 115) in terms of hardness and disintegration ability/uniformity.

If one or more of the parameters are not within the desired range, one proceeds to step 120. At step 120, compacts are made at different pressures. At step 125, the material is granulated and the properties of the dry granules studied to ascertain whether granulation by roller compaction is feasible.

In determining the suitability of the compact structure at step 115, a number of parameters are measured. A determination of compact density is generally made. When the compacts are comprised of a mid-sectional cylinder and two spherical segments, the total volume ($v_c$) of the compact is calculated by combining the volumes for all the segments as follows:

$$V_c = \frac{\pi}{4} d^2 h_i + 2[\pi h_2^2 (r - h_2/3)]$$

where d is the compact diameter, $h_1$ is the cylinder or band height, r is the half wheel diameter and $h_2$ is the cup depth or height of the segment (where the wheel diameter equals 4 times D-⅛ inch and D is the punch tip diameter). The surface area (A) of a spherical segment is calculated as follows:

$$A=2\pi rh$$

where r is the half wheel diameter and h is the segment height.

The compact density ($\rho_c$) may be calculated from the equation:

$$\rho_c = \frac{w_c}{v_c}$$

Compact weights ($w_c$) may be measured using an analytical balance, such as an Ohaus Balance model AP250D available from Ohaus Corp. of Florham Park, N.J. Volume of the compact ($v_c$) may be measured or calcaluted by methods well known to those of ordinary skill in the art.

The compaction pressure ($P_{compaction}$) to make the compact is also typically calculated as follows:

$$P_{compaction} = \frac{F}{A}$$

where F is the compaction force and A is the compact surface area.

Compact thickness may be measured using a hand held thickness gauge, for example, a Starrett gauge model 1010M available from Starrett Co. of Athol, Mass. Compact hardness should be measured using a tablet hardness tester, for example, a model 2E-106 and 6D tablet tester available from Dr. Schleuniger Pharmatron, Inc. of Manchester, N.H. Compact hardness testing is a measure of the overall integrity of the compact.

The ability of the compacts to maintain integrity during packaging and shipping, e.g., friability, is also measured. A low friability indicates a successful fabrication of compacts. Friability values of less than 1% are desirable. Compact friabilities may be measured, for example, using a tablet friabilator, available from Eberhard Bauer of Essingen, Germany. Conventionally, at least five compacts are tested to allow for statistical averaging of the results. After recording the initial weight ($W_i$) of all five compacts, the compacts are placed inside the friabilator drum and rotated for one hundred revolutions. After rotation, the compacts are removed and the final weight ($W_f$) recorded. The percentage of friability is calculated as follows:

$$\%\ \text{Friability} = \frac{W_i - W_f}{W_i}(100)$$

If the flow at step 105 is found to be less than desirable in one or more measured parameters, a number of compacts are made at different compaction pressures (step 120) and it is determined at step 125 whether there is an increase with density of the compact with compaction force and whether compacts fabricated are of sufficient hardness. If such is not the case, the material is reformulated with additives to enhance its compaction properties (step 135), and the process is reiterated from step 100. If, on the other hand at step 125 the compacts are deemed adequate, the compacts are granulated (step 130). At step 132, the bulk material is evaluated to determine if granules were formed. If granule formulation is unacceptable, the process returns back to step 120 with an increase in pressure. Upon successful granule formulation, one proceeds to step 134. The granules from each compact are then characterized in terms of flow properties (step 134). If at step 140, the granular flow properties are inadequate, then the material is reformulated at step 135 and the process re-iterated from step 100. If the granular flow properties are deemed adequate, the granules are recompressed and hardness re-tested (steps 145 and 150).

If at step 150, the re-compression is found to lack sufficient hardness, the material is reformulated at step 135 and the process re-iterated from step 100. If the hardness of the re-compressed compact is found satisfactory (e.g., between about 5–40 kilopond at 5,500 lb of pressure) (step 150), the material is deemed suitable for granulation on a roller compactor. The pressure used to make the compact from which the best granular material was obtained may then be used to determine the pressure to which the rollers of a roller compactor (e.g., a Fitzpatrick Roller Compactor Model IR-520 available from The Fitzpatrick Co. of Elmhurst, Ill.) should be set (step 155). The selected compaction pressure value is converted to total compaction force by multiplying the surface area of a compacted stick by the selected compaction pressure as follows:

$$F=P\times A$$

where F is the total force between rolls, P is the selected pressure and A is the compactor surface area. The compact surface area (A) is calculated as follows:

$$A=L\times W$$

where L is the stick length (roll width) and W is the stick width (axial groove width). The total compaction force (F) is applied to the roller compactor by converting the compaction force to force per linear inch of roll width and, in turn, to hydraulic pressure using the manufacturer's conversion table. On the roller compactor, the roll gap is typically set for a compact thickness of 0.5 cm. The horizontal and vertical feed screws are adjusted to maintain a steady powder flow to the rolls. The total compactor roll force is calculated using the equation:

$$F=P\times A$$

The pound force per linear inch of roll width is calculated as follows:

$$F_1 = \frac{F_2}{W}$$

where $F_1$ is the pound force per linear inch of roll width, $F_2$ is the total force between the rolls and W is the roll width. The roller compactor hydraulic pressure (P) may be calculated as follows:

$$P = \frac{WF_1}{A}$$

where W is the compactor roll width, A is the compactor hydraulic cylinder area and $F_1$ is the pound force per linear inch of roll width.

Once the small scale data is translated to parameters for the roller compactor, a production may be performed to confirm acceptable compression on a roller compactor (step 160). If at step 160, the results of the production run are evaluated, and the compacts found satisfactory, the roller compactor compacts may be used to prepare final dosage form (step 170). If unsatisfactory, the process continues to step 135. At step 135, substances with poor compression and flow properties, as determined at steps 125, 140, 150 and 160 are reformulated to improve the characteristics. After reformulation, the process resumes at step 100 and the analysis is repeated until a satisfactory result is achieved.

EXAMPLE

In exemplary tests, spray-dried lactose monohydrate (hereinafter "spray-dried lactose") was used as a reference substance that possesses the physical characteristics and good flow properties required for further processing, such as tablet manufacture, and a regular grade lactose (hereinafter "regular lactose"), which lacks good tableting attributes, was selected to model a material that needs further processing prior to final production into tablets.

Table 1 summarizes measurements indicative of overall flow made on spray-dried lactose and regular lactose (step 105):

TABLE 1

Material Characterization

| Test | Regular Lactose | Spray-Dried Lactose |
|---|---|---|
| Microscopy | Irregular shapes majority <25 μm | Uniformly spherical majority 50–100 μm |
| Bulk Density (g/cm$^3$) | 0.54 | 0.63 |
| Tapped Density (g/cm$^3$) | 0.89 | 0.70 |
| Carr Index (%) | 39.0 | 10.9 |
| Static Angle of repose | 41.3° | 8.6° |
| Flow Rate (g/sec) | 1.8* | 50 |
| Sieve Analysis | 61% <63 μm | 82% between 63–125 μm |

*Note: required constant vibration to maintain flow.

Spray-dried lactose was seen microscopically to have relatively larger, more uniform particles as compared to regular lactose. Regular lactose was seen to have a Carr Index of 39.0% foreboding poor overall flow quality. Spray lactose, on the other hand, had a Carr Index of 10.9% coinciding with a prediction of overall good flow quality. The static angle of repose for regular lactose suggests less than desirable overall flow characteristics. Gravity flow rate illustrates the poor flow quality of regular lactose as the flow rate was only 1.8 g/sec under conditions of constant vibration. Alternatively, the 50 g/sec gravity flow rate highlights the excellent flow characteristics of the spray-dried lactose. Regular lactose demonstrated more than 25% of its particles would pass through a 50 um sieve, while spray-dried lactose did not. From the totality of these measurements, spray-dried lactose was estimated to be a good candidate for dry compaction, while regular lactose monohydrate was indicated for further processing by granulation.

Figure 4:
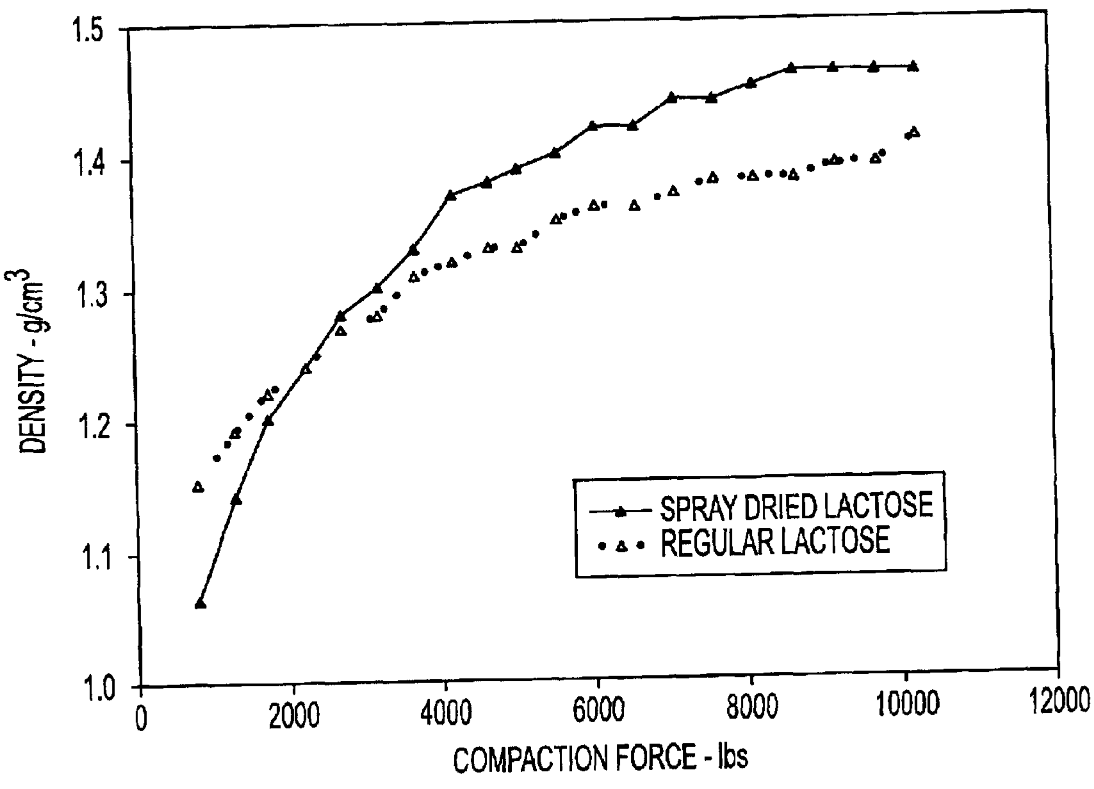
FIG. 4 is a graph illustrating an increase in density with compaction force for spray dried and regular lactose.

Several compacts of regular lactose were made at different pressures (step 120). Compact hardness for both regular and spray-dried lactose ranged from 1.4 to 5.5 kilopond for 1.2 cm compacts, which was adjudged adequate (step 125), and both were found to demonstrate an increase in density with compaction force (see FIG. 4). The compacts were then manually milled by dragging them across a mesh hand screen having 1 mm and 1.2 mm openings (step 130) (alternatively, a mechanical cone mill may be used to form granules). Satisfactory granule integrity was discerned with granules being formed instead of fine powder (step 132) (if the compacts turn into a fine powder, the compaction pressure should be increased and the manual milling attempted again). The granules were then tested for flow properties (step 134). The granules created that had the minimal fines and the overall greatest potential for flow were selected for further recompression analysis (steps 145 and 150).

Figure 5:
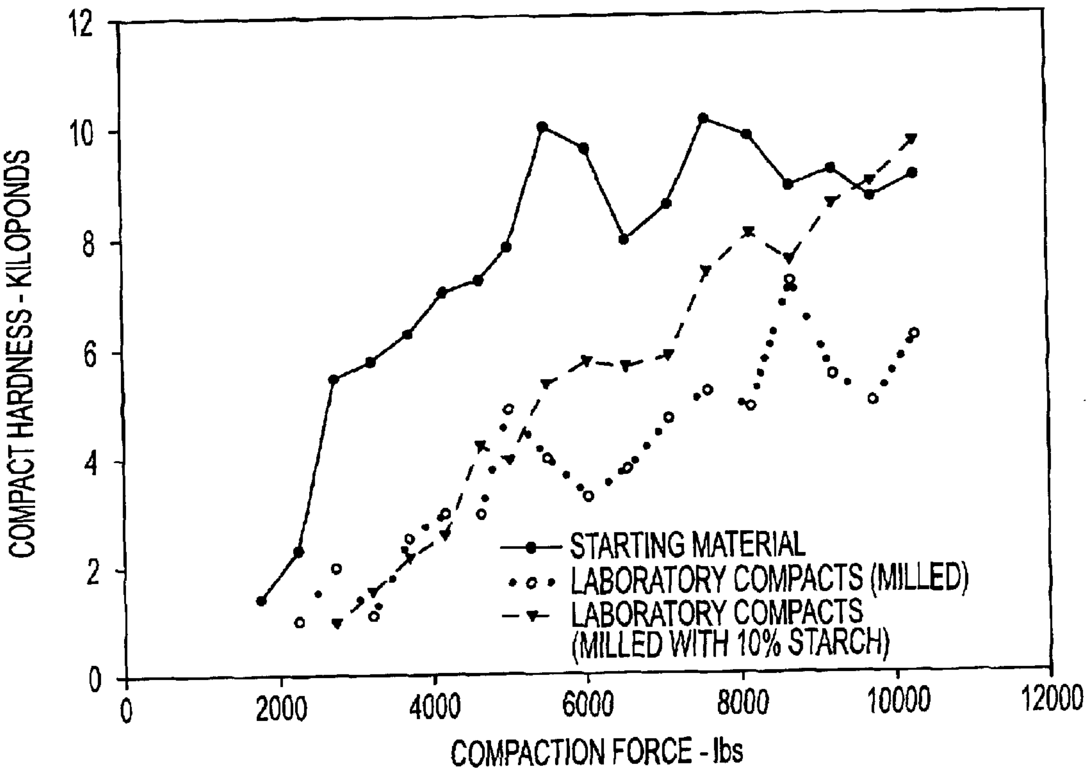
FIG. 5 is a graph illustrating compact hardness versus compaction force for recompressed regular lactose, recompressed milled lactose, and recompressed milled lactose with 10% starch.

The recompression profile of the granulized substance were determined using press punch assembly 10. The recompression profile measurements included the compact volume, density, pressure, weight, thickness, hardness and friability. Recompression hardness of regular lactose monohydrate was seen to improve both with milling and when 10% pregelatinized starch was added (see, FIG. 5). Evaluation of the processed regular lactose with starch, after recompression, yielded an increase in compact hardness of 30% to 40%. Friability on the recompressed compacts with pregelatinized starch was determined to be 0.38%, whereas friability of the recompressed regular lactose was 1.5%. Therefore, densification by dry compaction was optimized with a formula additive. Thus, regular lactose could be compacted, milled, reformulated and recompressed to provide the particle size, density and powder flow needed for further processing. In short, compression studies on the processed regular lactose suggested that although recompression yielded compacts of lower hardness values, the processed lactose was still very compressible and a formulation additive, such as pregelatinized starch, could additionally increase compressibility.

The manual compression pressure used to form the optimal granules discerned was then translated to a roller compactor (step 155).

Figure 6:
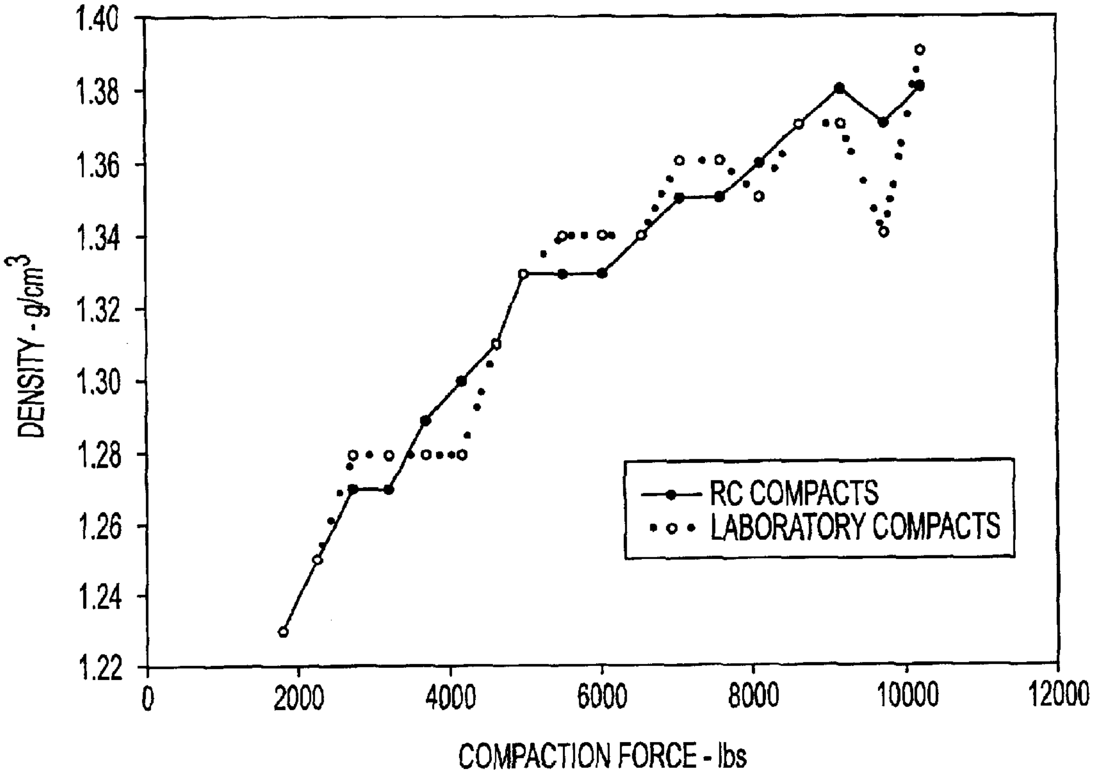
FIG. 6 is a graph illustrating density versus compaction force for recompressed laboratory processed regular lactose and recompressed roller-compactor processed regular lactose.
Figure 7:
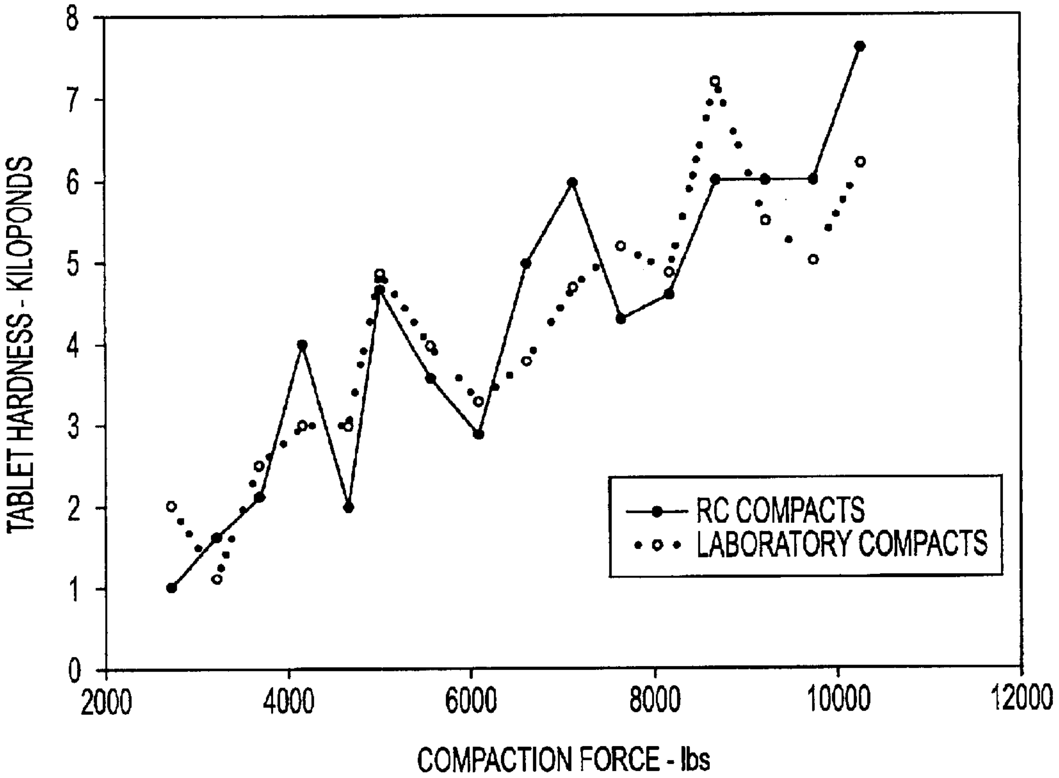
FIG. 7 is a graph illustrating compact hardness versus compaction force for recompressed laboratory-processed regular lactose and recompressed roller-compactor processed regular lactose.

FIG. 6 illustrates that recompressed laboratory and roller compactor material yielded compacts with similar densities. Recompressed compacts made by both methods similarly had a similar hardness profile as illustrated in FIG. 7. When the compacts created by the laboratory and production methods were subjected to friability testing both materials had similar friabilities as indicated in Table 2:

TABLE 2

Compact Friability Comparisons: Laboratory vs. Roller Compactor

| Material | Laboratory Compacts % Friability | Roller Compactor Compacts % Friability |
|---|---|---|
| Regular Lactose | 1.5 | 4.9 |
| Regular Lactose with 10% Pregelatinized Starch | 0.38 | 0.54 |

Table 3 indicates that the granules milled from both laboratory and production method compacts possessed similar properties as well:

TABLE 3

Regular Lactose Granules: Laboratory vs. Roller Compactor Compacts

| Test | Laboratory Compacts | Roller Compactor Compacts |
|---|---|---|
| Morphology (SEM) | agglomerated chunks | agglomerated chunks |
| Bulk Density (g/cm$^3$) | 0.64 | 0.72 |
| Tapped Density (g/cm$^3$) | 0.98 | 0.94 |
| Compact Density (g/cm$^3$) | 1.3 | 1.3 |
| Carr Index (%) | 34.2 | 23.7 |
| Static Angle of repose | 29.8° | 28.7° |
| Flow Rate (g/sec) | 15.0 | 28.2 |
| Sieve Analysis | 17.4% less than 63 μm | 14.0% less than 63 μm |

Thus, data generated in the laboratory on a hydraulic press can be correlated to a production roller compactor to produce dry granulated material or compacts that have very similar characteristics. Therefore, a parametric correlation exists between laboratory and production scale allowing many process parameters to be transferred directly, thus saving time and material.

Although, the proposed apparatus and methods have been described with reference to pharmaceutical applications, it is envisioned that the apparatus and methods herein could be applied equally successfully to other applications such as, but not limited to, fertilizers, food for humans and animals and any material which may be dry compacted. Further, while preferred embodiments have been discussed in detail, those skilled in the art will readily appreciate that various changes and/or modifications can be made without departing from the spirit or scope of the apparatus and methods as defined by the appended claims.

What is claimed is:

1. A method of evaluating new drug candidate formulations for fabrication by compaction, the method comprising the steps of:

(a) determining the flow properties of the new drug candidate formulations;

(b) preparing compacts of said new drug candidate formulations;

(c) preparing granules from the compacts of step (b) made from said new drug candidate formulations which do not demonstrate all three of the following flow properties: (1) a Carr Index below about 15%; (2) a static angle of repose between about 20° and about 40°, (3) gravity free flow;

(d) characterizing the flow properties of granules produced in step (c);

(e) recompressing the granules of step (c) which demonstrate all three of the following flow properties: (1) a Carr Index below about 15%; (2) a static angle of repose between about 20° and about 40°, (3) gravity free flow;

(f) evaluating the recompressions of step (e) for acceptable hardness and release of the new drug candidate.

2. A method as recited in claim 1, wherein the compacts are formed from less than about fifty grams of the new drug candidate formulation.

3. A method for determining if a formulation, is suitable for dry granulation by roller compaction, said method comprising:

(a) preparing a plurality of material compacts on a linear press utilizing a plurality of compression forces starting from the minimal force necessary to produce a visibly non-friable compact;

(b) milling the plurality of material compacts through a mesh of sufficient size to form granule fractions rather than fine powder fractions;

(c) measuring one or more properties of the granule fractions of step (b) selected from the group of properties consisting of: (1) the Carr index, (2) the static angle of repose, (3) particle size distribution, (4) particle morphology;

(d) determining those granule fractions having at least one of the following characteristics: (1) a Carr Index below about 15%; (2) a static angle of repose between about 20° and about 40°, (3) a particle size distribution such that less than about 25% of the total mass of the granule fraction passes through a 50 micron sieve, (4) generally smooth particle morphology; and (e) adjudging the material or material formulation suitable for dry granulation by roller compaction based on one or more of the granule fractions of step (d) being recompressible into a non-friable compaction.

4. A method for setting the compaction pressure of a production scale roller compactor for a particular material/material formulation comprising:

(a) preparing a plurality of compacts of the material on a linear press utilizing a plurality of compression forces;

(b) milling the plurality of material compacts through a mesh of sufficient size to form granule fractions rather than fine powder fractions;

(c) determining the granule fraction having the best flow as characterized by the fraction's Carr Index and Angle of Repose;

(d) setting the compaction pressure of a production scale roller compactor to a pressure approximately (±20%) the pressure used to form the compact from which the granule fraction having the best flow was milled.

5. A method as recited in claim 4, wherein the compacts of step (a) comprise less than fifty grams of material.

* * * * *